(12) United States Patent
Ubbels

(10) Patent No.: US 7,776,930 B2
(45) Date of Patent: Aug. 17, 2010

(54) METHODS FOR INHIBITING NAPHTHENATE SALT PRECIPITATES AND NAPHTHENATE-STABILIZED EMULSIONS

(75) Inventor: Sen J. Ubbels, Dclden (NL)

(73) Assignee: Champion Technologies, Inc., Houston, TX (US)

( * ) Notice: Subject to any disclaimer, the term of this patent is extended or adjusted under 35 U.S.C. 154(b) by 1103 days.

(21) Appl. No.: 10/869,826

(22) Filed: Jun. 16, 2004

(65) Prior Publication Data

US 2005/0282915 A1 Dec. 22, 2005

(51) Int. Cl.
B01D 17/05 (2006.01)
C09K 8/524 (2006.01)
E21B 37/06 (2006.01)
B01F 17/14 (2006.01)
C09K 8/60 (2006.01)

(52) U.S. Cl. .......................... 516/145; 507/90
(58) Field of Classification Search ................. 516/145; 507/90
See application file for complete search history.

(56) References Cited

U.S. PATENT DOCUMENTS

| | | | |
|---|---|---|---|
| 2,143,991 A | | 1/1939 | Loomis |
| 4,192,767 A | | 3/1980 | Flournoy et al. |
| 4,384,977 A | * | 5/1983 | Duke .......................... 516/163 |
| 4,396,530 A | * | 8/1983 | Duke .......................... 516/140 |
| 4,446,002 A | | 5/1984 | Siegmund |
| 4,514,322 A | * | 4/1985 | Swoboda ............... 252/519.33 |
| 4,846,957 A | | 7/1989 | Johnson et al. |
| 5,008,026 A | * | 4/1991 | Gardner et al. .............. 507/235 |
| 5,092,405 A | * | 3/1992 | Prukop ....................... 507/225 |
| 5,112,505 A | | 5/1992 | Jacobs et al. |
| 5,130,473 A | | 7/1992 | Jacobs et al. |
| 5,156,675 A | * | 10/1992 | Breton et al. ............. 106/31.43 |
| 5,213,691 A | | 5/1993 | Emmons et al. |
| 5,252,254 A | | 10/1993 | Babaian-Kibala |
| 5,283,235 A | * | 2/1994 | Bush et al. .................. 507/118 |
| 5,420,040 A | | 5/1995 | Anfindsen et al. |
| 5,482,484 A | * | 1/1996 | Askestad ....................... 441/5 |
| 5,500,107 A | * | 3/1996 | Edmondson ................. 208/47 |
| 5,552,085 A | | 9/1996 | Babaian-Kibala |
| 5,863,415 A | | 1/1999 | Zetlmeisl |
| 5,948,237 A | | 9/1999 | Miller et al. |
| 5,969,237 A | | 10/1999 | Jones et al. |
| 5,985,137 A | * | 11/1999 | Ohsol et al. ................. 208/263 |
| 6,051,535 A | | 4/2000 | Bilden et al. |
| 6,225,263 B1 | * | 5/2001 | Collins et al. ............... 507/261 |
| 6,294,093 B1 | | 9/2001 | Selvarajan et al. |
| 6,547,957 B1 | * | 4/2003 | Sudhakar et al. ....... 208/111.01 |
| 6,716,358 B2 | | 4/2004 | Varadaraj |
| 2004/0072361 A1 | | 4/2004 | Varadaraj et al. |

FOREIGN PATENT DOCUMENTS

| | | |
|---|---|---|
| CA | 2029465 | 11/1990 |
| CA | 2277052 | 7/1998 |
| CA | 2386721 | 4/2001 |
| CA | 23886314 | 4/2001 |
| CA | 2455854 | 2/2003 |
| GB | 2337522 | 5/1999 |
| WO | WO 98/30784 * | 7/1998 |
| WO | WO 01/27438 * | 4/2001 |
| WO | WO 01/29370 * | 4/2001 |
| WO | WO 03/012253 A3 * | 2/2003 |

OTHER PUBLICATIONS

Lewis, Richard J., Sr. (2002). Hawley's Condensed Chemical Dictionary (14th Edition). (pp: ). John Wiley & Sons. Online version available at: http://knovel.com/web/portal/browse/display?_EXT_KNOVEL_DISPLAY_bookid=704&VerticalID=0 , Entry: "cation".*
Copyright © Webster's Third New International Dictionary, Unabridged, Copyright © 1993 Merriam-Webster.Published under license from Merriam-Webster, Incorporated.http://lionreference.chadwyck.com/searchFulltext.do?id=17573917&idType=offset&divLevel=2&queryId=../session/1247850186_24135&area=mwd&forward=refshelf&trail=refshelf , Headword: "inhibit".*
Schlumberger Oilfield Glossary, @ http://www.glossary.oilfield.slb.com/Display.cfm?Term=production, "raw crude oil", "nonhydrocarbon contaminants", "emulsion", and "brine" (Jul. 2009).*
Lewis, Richard J., Sr. (2002). Hawley's Condensed Chemical Dictionary (14th Edition). (pp: ). John Wiley & Sons. Online version available at: http://knovel.com/web/portal/browse/display?_EXT_KNOVEL_DISPLAY_bookid=704&VerticalID=0 , Entry: "amphiphilic", "surface active agent", and "surfactant". pp. 1-8.*
Schlumberger Oilfield Glossary, @ http://www.glossary.oilfield.slb.com/Display.cfm?Term=production, "demulsifier" (Oct. 2009).*
PCT International Search Report—Mar. 1, 2006, EPO, Haag, NL, 3 pages.
Trond Erik Havre; "Formation of Calcium Naphthenate in Water/Oil Systems, Naphthenic Acid Chemistry and Emulsion Stability"; Department of Chemical Engineering Norwegian University of Science and Technology; pp. 1-64, (Oct. 2002).

(Continued)

Primary Examiner—Daniel S Metzmaier
(74) Attorney, Agent, or Firm—Jeffrey L. Streets; Streets & Steele

(57) ABSTRACT

Inhibiting naphthenate salts that can form precipitates or emulsions during crude oil production or processing. An effective amount of a naphthenate inhibitor, such as a hydrotrope, is provided into the production fluids for contact with mixtures of oil and water in the formation, the production equipment, or processing systems. It is believed that the naphthenate inhibitors, such as monophosphate ester or diphosphate ester, exhibit surface-active properties that cause the inhibitors to align and concentrate in a layer at the oil-water interface and thereby prevent interactions between organic acids in the oil phase with cations or cation complexes in the water. It is believed that the physical positioning and geometry of the naphthenate inhibitor blocks the growth of naphthenate salt crystals. However, it is preferred that the naphthenate inhibitors also avoid the formation of oil-in-water and water-in-oil emulsions.

40 Claims, No Drawings

OTHER PUBLICATIONS

Inge Harald Auflem; "Influence of Asphaltene Aggregation and Pressure on Crude Oil Emulsion Stability"; Department of Chemical Engineering Norwegian University of Science and Technology; pp. 1-51, (Jun. 2002).

Poggesi et al. "Multifunction Chemicals for West African Deep Offshore Fields", SPE 74649, Jan. 2002, pp. 1-6.

Vindstad, et al. "Fighting Naphthenate Deposition at the Heidrun Field", SPE80375, Jan. 2003, pp. 1-7.

Goldszal et al. "Scale and Naphthenate Inhibition in Deep-Offshore Fields" SPE 74661, Jan. 2002, pp. 1-11.

Gallup et al. "Formation & Mitigation of 'Metallic Soap' Sludge, Attaka, Indonesia Field" SPE 73960, Unocal Indonesia, Mar. 2002, pp. 1-16.

T.G. Balson "Something Old, Something New: A Discussion about Demulsifiers" pp. 226-238; Chemistry in the Oil Industry VIII Nov. 3-5, 2003, Manchester Conference Centre, UK, 3 page PROGRAMME.

Ogden, P.H. "Chemicals in the Oil Industry: Developments and Applications", Akzo Chemie UK Ltd, Royal Society of Chemistry, 3 pages.

EPO "Communication of a notice of opposition" Sep. 30, 2009, pp. 1-5. (including English translation).

* cited by examiner

METHODS FOR INHIBITING NAPHTHENATE SALT PRECIPITATES AND NAPHTHENATE-STABILIZED EMULSIONS

BACKGROUND OF THE INVENTION

1. Field of the Invention

The present invention relates to methods and compositions for inhibiting the formation of naphthenate precipitates or naphthenate-stabilized emulsions during contact between crude oil containing naphthenic acid and water containing cations.

2. Description of the Related Art

Crude oil includes various high molecular weight hydrocarbon-containing compounds, frequently including naphthenic acid. Naphthenic acids are classified as carboxylic acids of the general formula R—COOH, where R represents a cyclo-aliphatic structure typically having 10 to 50 carbon atoms and 0 to 6 rings. The term "naphthenic acid" is generally used to account for carboxylic acids present in crude oil, including acyclic and aromatic acids. Naphthenic acids are found predominantly in immature biodegraded crude oils. The amount of organic acid present in crude oil is expressed by the total acid number (TAN), often in units of milligrams KOH per gram of crude. For example, crude oil produced from the North Sea, the Far East and Western Africa exhibit high TAN numbers, such as a TAN greater than one (1), including high concentrations of naphthenic acids.

One problem experienced during production of crude oils having a high TAN number, is the formation of calcium naphthenate precipitates and/or naphthenate stabilized emulsions. The carboxylic group present in naphthenic acids exhibits a hydrophilic nature that causes the carboxyl to congregate at the oil-water interface. As the crude oil is produced, the pressure in the crude oil drops and carbon dioxide is lost from the solution. The loss of carbon dioxide causes the pH of the crude oil to increase and, in turn, leads to dissociation of the naphthenic acid. The naphthenates can then act as natural surfactants leading either to stabilized emulsions or solid deposits following complexation with calcium or other cations present in the aqueous phase. The naphthenate deposits can accumulate in flow-lines, heat-exchangers, oil-water separators, desalters, filters, hydro-cyclones, and the like.

When naphthenic acids in crude oil are combined with high pH, highly mineralized connate waters, the processes that separate oil and water can experience severe problems. The neutralization products of naphthenic acids with basic ions in the water tend to form very stable water-in-oil emulsions and/or insoluble sticky calcium naphthenate deposits. These phenomena can hamper the oil production considerably and result in high treatment costs.

Existing treatments to prevent the formation of calcium naphthenate precipitates and emulsions during oil production include the injection of large volumes of acetic acid in order to decrease the pH of the oil and water phases, thus favoring naphthenic acid over the formation of naphthenate salts. However, to accomplish this task requires continuous injection of about 100 to 1000 parts per million (ppm) of acetic acid to achieve a pH below at least 6.0 and sometimes even below 5.2. However, this acid is very corrosive and presents various health, safety, and environmental issues. Furthermore, the shear volume of acetic acid solution that is necessary represents a significant storage and supply problem, especially on offshore oil production platforms. Also, lowering the pH of the produced waters may lead to serious internal corrosion of the crude oil processing equipment. The result is that preventing the formation of naphthenate precipitates and emulsions comes at a high cost.

Therefore, there is a need for an improved method of inhibiting the formation of naphthenate precipitates and emulsions during the production of crude oil. There is also a need for a composition or formulation that is more effective at inhibiting naphthenate precipitates and emulsions. It would be desirable if the method and composition required smaller volumes of active chemical, lower dosage rates, smaller pH adjustments, and lower costs.

SUMMARY OF THE INVENTION

The present invention provides a method comprising adding an inhibitor composition to a mixture of water and oil in an amount that is effective to inhibit interaction between cations in the water and organic acid in the oil. The cations originating from the water, such as connate water, formation water or seawater, may include an inorganic cationic species. Examples of a cationic species include from calcium cations, magnesium cations, sodium cations, or combinations thereof. The organic acid originating from the oil may include a naphthenic acid. The inhibitor compositions are suitable for use with oil having a total acid number (TAN) greater than 0.5 and even a TAN greater than 1. Preferably, the inhibitor composition is effective to inhibit formation of organic salts.

In one embodiment, the inhibitor composition inhibits the cations and organic acid, such as a naphthenic acid, from interacting along an oil-water interface. Preferably, the inhibitor composition inhibits formation of an organic salt, such as a naphthenate salt, along an oil-water interface. More preferably, the inhibitor composition inhibits naphthenate salt formation along an oil-water interface. Accordingly, the inhibitor composition may have a hydrophilic portion and an oleophilic portion. In one embodiment, the inhibitor composition includes the product formed by a reaction between phosphorus pentoxide and an alcohol.

The inhibitors composition may be a surfactant, such as an anionic surfactant, amphoteric surfactant, or a combination thereof. More particularly, the surfactant may be selected from phosphates, sulfates, sulphonates, suphosuccinates, polysulphosuccinates, phenols, betaines, thiocarbamates, xanthates and combinations thereof. It is believed that these inhibitor compositions concentrate along the oil-water interface. Preferably, the inhibitor composition is characterized by an inability to form organized phases, such as when the inhibitor composition includes atleast one hydrotrope. The hydrotropes may be in an acid form, a salt form, or a combination thereof. A preferred hydrotope includes a compound selected from the surfactant class of hydrotropes. A most preferred hydrotrope includes monophosphate ester, diphosphate ester, or a combination thereof. One example of a preferred inhibitor composition includes a phosphate ester having an organic side chain comprising the product formed by a reaction between a fatty acid and 1 to 9 moles of ethyleneoxide, propylene-oxide, bulylene-oxide, or a combination thereof.

The inhibitor compositions of the invention are preferably added at a concentration of less than 500 ppm in the mixture of oil and water, more preferably at less than 250 ppm, even more preferably less than 120 ppm, and optionally even less than 50 ppm. Optionally, the inhibitor composition may further comprise acetic acid, but preferably less than 200 ppm acetic acid. However, it is preferable to provide the inhibitor composition in the absence of acetic acid. In one embodiment, the amount of inhibitor composition added to the oil and water mixture is effective to protonate naphthenate salts formed prior to the addition of the inhibitor composition. Preferably, the methods of the invention are characterized in that the pH of the oil and water mixture is greater than 5.2 following the addition of the inhibitor composition, more preferably greater than 6, and most preferably about 7.

The step of adding the inhibitor composition may include injecting the inhibitor composition downhole, dosing the inhibitor composition to an oil-water separator, or providing the inhibitor composition at another desirable point. Optionally, the inhibitor composition may be added as the oil and water mixture is being produced from a formation. Preferably, the inhibitor composition is added before a choke, manifold, turret, or a combination thereof. The method may include, after adding the inhibitor composition, reducing the pressure to release carbon dioxide gas from the oil. Optionally, the method may include reducing the pressure on the mixture to release carbon dioxide gas from the mixture before adding the inhibitor composition. Accordingly, the inhibitor composition may be added after a choke, manifold, turret, or a combination thereof.

DETAILED DESCRIPTION OF A PREFERRED EMBODIMENT

The present invention provides a method of inhibiting, dissolving, or dispersing calcium naphthenate salts or other naphthenate salts that can form precipitates or emulsions during crude oil production or processing. The method includes adding an effective amount of a naphthenate inhibitor into the production fluids for contact with mixtures of oil and water in the formation, the production equipment, or processing systems. It is believed that the naphthenate inhibitors of the present invention exhibit surface-active properties that cause the inhibitors to align and concentrate in a layer at the oil-water interface. Having the naphthenate inhibitors at the oil-water interface serves to prevent interactions between organic acids in the oil phase with monovalent, di-valent and/or poly-valent cations or cation complexes in the water. It is believed that the physical positioning and geometry of the naphthenate inhibitor blocks the growth of naphthenate salts. However, it is preferred that the naphthenate inhibitors also avoid the formation of oil-in-water and water-in-oil emulsions.

The present invention also provides naphthenate inhibitor compositions for inhibiting naphthenate salt formation, precipitation or emulsions. Preferred naphthenate inhibitor compounds include acids that are stronger than the carboxylic acids in the crude in order to protonate the weaker naphthenic acids. However, it is also preferred that the naphthenate inhibitor compounds are non-emulsifying. One particularly preferred class of these compositions includes the surfactant class of hydrotropes. As used herein, the term "hydrotrope" means a compound having surfactant qualities that is less likely to form organized phases and therefore have a lower emulsifying tendency. Accordingly, hydrotropes frequently have a hydrocarbon tail that is suitably shaped or bulky to prevent or interrupt the self organization of the surface active material. Hydrotropes may be used in their acid form or weak base salt form, but must be either water-soluble or oil-soluble. Anionic and amphoteric hydrotropes are deemed to be particularly useful in this invention.

However, it is believed that other surfactants that would not be classified as hydrotropes may also exhibit qualities that are beneficial in inhibiting naphthenate salt formation. These other surfactants may include both anionic surfactants and amphoteric surfactants. Examples of anionic surfactants include phosphates, phosphonates (such as $R_1NR_2R_3$, wherein $R_1$ is an organic moiety, and $R_2$ and $R_3$ are independently selected from $-(CH_2P(=O)(OH)_2)$ or H or an organic moiety; or salts of these phosphonates, or quaternary salts of these phosphonates) acrylic acids, sulfates, sulphonates, sulphosuccinates, polysulphosuccinates, betaines, thiocarbamates, xanthates and the like. Preferred naphthenate inhibitors should also exhibit low corrosivity and will be compatible with other demulsifiers. Further still, it is preferred that the naphthenate inhibitors are environmentally friendly, such as exhibiting biodegradability, no bioaccumulation, as well as low toxicity to marine species. Specific examples of suitable surfactants include, without limitation, phenols, carboxylic acids, betaines, thiocarbamates, xanthates, phosphonates, phosphate esthers, sulfates, sulfonates, and sulfosuccinates and derivatives of these surfactants. Specific examples of phosphonates include mono-amine, di-amine, tri-amine, tetra-amine, penta-amine and other polyamine phosphonates, as well as mono-alkyl, di-alkyl, and tri-alkyl phosphonates. Specific examples of acrylic acids include surface-active modified polyacrylic acids, as well as polyalkyl sulphosuccinates.

Preferred naphthenate inhibitor compositions include phosphate esters and sulphonic acids. Presently, the most preferred inhibitor composition includes a monophosphate ester, a diphosphate ester, or a combination thereof. These phosphate esters have been successfully used and shown to be approximately twenty times as effective as acetic acid per unit volume of inhibitor. Other successfully used or tested compositions include sulphonates, sulphosuccinates and ethoxylated fatty acids in combination with polymeric surfactants like poly-glycol esters, poly-imines and epon-resins.

Naphthenate inhibitor compositions comprising a phosphate ester may be made or obtained in various ways. For example, phosphate esters may be prepared from phosphorus chloride ($PCl_3$) or polyphosphoric acid. However, the presently most preferred method of forming the phosphate ester-based naphthenate inhibitors includes the reaction of phosphorus pentoxide with alcohols (ROH) to generate the mono-alkyl and di-alkyl (aryl or mixed alkyl/aryl) phosphonic acid. Alcohols (ROH) of the class alkyl, aryl substituted aryl having linear, branched, cyclic and substituted cyclic structures including their oxyalkylated derivatives containing 1 to 9 moles ethylene oxide (EO), propylene oxide (PO) or butylene oxide (BO) and/or mixtures thereof per hydroxyl can be beneficial in producing (calcium) naphthenate salt inhibitors. This reaction yields one mole of monophosphate ester ($R-O-P(=O)(OH)_2$) and one mole of diphosphate ester ($(R-O)_2-P(=O)(OH)$). This reaction product can be used as a naphthenate inhibitor without further modification or purification of the active ingredients.

Hydrotropes or other suitable surfactants of the present invention are preferably added to production or processing streams containing oil and water in an amount effective to inhibit naphthenate salt formation, precipitation or emulsions. The naphthenate inhibitor compositions are effective at concentrations less than the dose rate required of acetic acid. While it is recognized that the necessary dosage of a naphthenate inhibitor will vary based on the composition of the crude oil and the composition of the connate water, it is generally unnecessary to use more than 200 ppm of the present naphthenate inhibitors even in the absence of acetic acid. A preferred naphthenate inhibitor dosage is 100 ppm based on total fluids. The naphthenate inhibitors are also used at concentrations of 50 ppm or less in combination with a reduced dosage of acetic acid. In fact, a concentration of about 40 ppm of a mixture of monophosphate ester and diphosphate ester has been shown to be effective in combination with acetic acid, while reducing the acetic acid dosage by about 70% to 100 ppm or less.

The present methods and compositions provide the advantages of using lower quantities of chemicals in avoiding the corrosivity that comes with operating at lower pH. Improvements in logistics and reduction of costs are significant.

The naphthenate inhibitors are dosed in the oil/water mixtures (emulsions) as they are produced from the formation. The best dosage point is just before the pressure release of the fluids, such as just before a choke, the manifold, the turret or any other place where the pressure drops significantly. Also, it is possible to successfully inject a naphthenate inhibitor at a point immediately downstream of fluid pressure release. Naphthenate deposits or emulsions are typically formed after the pressure on the fluid is released from the system, because carbon dioxide gas ($CO_2$) will escape from the fluid at reduced pressures, resulting in an increased pH and the formation of naphthenate salts. Preferably, the naphthenate inhibitor is injected into the fluid prior to formation of the naphthenate salts, although injection following naphthenate salt formation may also be successful.

EXAMPLES

Example 1

A solution was prepared as a surrogate for connate water by combining 1% calcium chloride and 2.5% sodium chloride in water and adjusting the pH to 8. Another solution was prepared as a surrogate for crude oil by combining 1% naphthenic acid in aliphatic hydrocarbons. 50 ml of each solution was combined and shaken for five minutes. Upon standing, a thick oil-in-water emulsion was observed, apparently stabilized by a solid layer of calcium naphthenate at the interface of each droplet.

Example 2

A connate water surrogate solution and a crude oil surrogate solution were prepared as described in Example 1. 50 ml of each solution was combined. However, before shaking, 500 ppm of acetic acid was added to the combination of surrogate solutions. All of the fluids were then shaken together for five minutes. Upon standing, the fluids separated easily with no apparent emulsions or calcium naphthenate solids. The pH was measured at 5.2.

Example 3

A connate water surrogate solution and a crude oil surrogate solution were prepared as described in Example 1. 50 ml of each solution was combined. However, before shaking, 40 ppm of a mixture of monophosphate ester and diphosphate ester and 100 ppm of acetic acid were added to the combination of surrogate solutions. All of the fluids were then shaken together for five minutes. Upon standing, the fluids separated easily with no apparent emulsions or calcium naphthenate solids. The pH was measured at 7.0.

Example 4

A connate water surrogate solution and a crude oil surrogate solution were prepared as described in Example 1. 50 ml of each solution was combined. However, before shaking, 100 ppm of a mixture of monophosphate ester and diphosphate ester was added to the combination of surrogate solutions. All of the fluids were then shaken together for five minutes. Upon standing, the fluids separated easily with no apparent emulsions or calcium naphthenate solids. The pH was measured at 7.0.

Example 5

A naphthenate salt inhibitor solution containing a phosphate ester was prepared. A linear fatty alcohol having 9 to 11 carbon atoms was reacted with ethylene oxide at molar ratios of 9, 6, and 3, respectively. The three resulting reaction products were then further reacted with phosphorus pentoxide at a molar ratio of about 0.5. The final products were believed to each contain a mixture of monophosphate ester and diphosphate ester, albeit having different side chain lengths. Each of the three products were mixed and shaken for 5 minutes with 50 ml of the connate water surrogate and 50 ml of the crude oil surrogate described in Example 1. Upon standing, each of the three bottles showed no calcium naphthenate solids. It was noticed that the alkyl groups with increasing oxide content tended to create increased quantities of emulsion.

Example 6

A naphthenate salt inhibitor solution containing a phosphate ester was prepared. 2-ethyl hexanol was reacted with phosphorus pentoxide at a molar ratio of about 0.5. The final product was believed to contain a mixture of monophosphate ester and diphosphate ester. The product was mixed and shaken for 5 minutes with 50 ml of the connate water surrogate and 50 ml of the crude oil surrogate described in Example 1. Upon standing, the bottle showed no calcium naphthenate solids and no evidence of emulsions.

The term "inhibit" as used herein means to restrain from full and free occurrence of some act or event, and is not limited to a definite and known degree of restraint. Accordingly, it should be recognized that the use of a composition to "inhibit" interaction between cations and organic acids does not mean that a given amount of the composition will necessarily produce a direct, measurable and known change in the interaction, since other factors may change in a manner that offsets the use of the composition. For example, a crude oil having a low TAN number, such as less than 0.3, or a water stream having a low concentration of calcium or magnesium ions may have little tendency to interact and form naphthenate salts even without use of an inhibitor composition. By contrast, a crude oil having a high TAN number and water having a high calcium or magnesium ion concentration may produce a significant amount of precipitates or emulsions. While the use of an inhibitor composition will reduce the formation of naphthenate salts and the resulting precipitates or emulsions, the naphthenate salt concentration may still be higher than in the production fluids of a low TAN crude. Still, the naphthenate salt-content in the production fluid of a high TAN crude oil will be inhibited with use of an inhibitor composition relative to the naphthenate salt-content in the production fluid of the same crude oil without an inhibitor composition.

The terms "comprising," "including," and "having," as used in the claims and specification herein, shall be considered as indicating an open group that may include other elements not specified. The term "consisting essentially of," as used in the claims and specification herein, shall be considered as indicating a partially open group that may include other elements not specified, so long as those other elements do not materially alter the basic and novel characteristics of the claimed invention. The terms "a," "an," and the singular forms of words shall be taken to include the plural form of the same words, such that the terms mean that one or more of something is provided. For example, the phrase "solution comprising a hydrocarbon-containing compound" should be read to describe a solution having one or more hydrocarbon-containing compound. The term "one" or "single" may be used to indicate that one and only one of something is intended. Similarly, other specific integer values, such as "two," may be used when a specific number of things is intended. The terms "preferably," "preferred," "prefer," "optionally," "may," and similar terms are used to indicate that an item, condition or step being referred to is an optional (not required) feature of the invention.

It should be understood from the foregoing description that various modifications and changes may be made in the preferred embodiments of the present invention without departing from its true spirit. It is intended that this foregoing description is for purposes of illustration only and should not be construed in a limiting sense. Only the language of the following claims should limit the scope of this invention.

What is claimed is:

1. A method, comprising:
    adding an inhibitor composition having a hydrophilic portion and an oleophilic portion to a mixture of water and oil in an amount that is effective to inhibit cations in the water and organic acid in the oil from interacting along an oil-water interface, wherein the inhibitor composition is added before a choke, manifold, turret, or a combination thereof; and
    after adding the inhibitor composition, reducing the pressure to release carbon dioxide gas from the oil.

2. The method of claim 1, wherein the cations include an inorganic cationic species.

3. The method of claim 1, wherein the cations include a cationic species selected from calcium cations, magnesium cations, sodium cations, and combinations thereof.

4. The method of claim 1, wherein the organic acid includes a naphthenic acid.

5. The method of claim 4, wherein the inhibitor composition inhibits naphthenate salt formation along an oil-water interface.

6. The method of claim 4, wherein the inhibitor composition is added at a concentration of less than 250 ppm in the mixture of oil and water.

7. The method of claim 4, wherein the inhibitor composition is added at a concentration of less than 120 ppm in the mixture of oil and water.

8. The method of claim 7, wherein the inhibitor composition further comprises acetic acid.

9. The method of claim 7, wherein the inhibitor composition further comprises less than 200 ppm acetic acid.

10. The method of claim 7, wherein the inhibitor composition is provided in the absence of acetic acid.

11. The method of claim 4, wherein the inhibitor composition is added at a concentration of less than 50 ppm in the mixture of oil and water.

12. The method of claim 1, wherein the inhibitor composition inhibits organic salt formation along an oil-water interface.

13. The method of claim 12, wherein the organic acid includes a naphthenic acid, and wherein the organic salt includes a naphthenate salt.

14. The method of claim 1, wherein the inhibitor is a surfactant.

15. The method of claim 14, wherein the surfactant is selected from anionic surfactants, amphoteric surfactants, and combinations thereof.

16. The method of claim 14, wherein the surfactant is selected from phosphates, sulfates, sulphonates, sulphosuccinates, polysulphosuccinates, phenols, betaines, thiocarbamates, xanthates and combinations thereof.

17. The method of claim 1, wherein the inhibitor composition concentrates along the oil-water interface.

18. The method of claim 17, wherein the inhibitor composition is characterized by an inability to form organized phases.

19. The method of claim 17, wherein the inhibitor composition includes at least one hydrotrope.

20. The method of claim 19, wherein the hydrotope is in an acid form, a salt form, or a combination thereof.

21. The method of claim 20, wherein the at least one hydrotrope includes monophosphate ester, diphosphate ester, or a combination thereof.

22. The method of claim 17, wherein the inhibitor composition includes a compound selected from the surfactant class of hydrotropes.

23. The method of claim 1, wherein the inhibitor composition includes the product formed by a reaction between phosphorus pentoxide and an alcohol.

24. The method of claim 1, wherein the water is connate water or formation water.

25. The method of claim 1, wherein the inhibitor composition is added at a concentration of less than 500 ppm in the mixture of oil and water.

26. The method of claim 1, wherein the amount of inhibitor composition added to the oil and water mixture is effective to protonate naphthenate salts formed prior to the addition of the inhibitor composition.

27. The method of claim 1, wherein the water is selected from connate water, seawater, and combinations thereof.

28. The method of claim 1, wherein the step of adding the inhibitor composition includes injecting the inhibitor composition downhole.

29. The method of claim 1, characterized in that the pH of the oil and water mixture is greater than 5.2 following the addition of the inhibitor composition.

30. The method of claim 1, characterized in that the pH of the oil and water mixture is greater than 6 following the addition of the inhibitor composition.

31. The method of claim 1, further comprising:
    adding the inhibitor composition as the oil and water mixture is being produced from a formation.

32. The method of claim 1, wherein the oil has a TAN greater than 1.

33. The method of claim 1, wherein the oil has a TAN greater than 0.5.

34. A method, comprising:
    reducing the pressure on a mixture of water and oil to release carbon dioxide gas from the mixture; and then
    adding an inhibitor composition having a hydrophilic portion and an oleophilic portion into the mixture in an amount that is effective to inhibit cations in the water and organic acid in the oil from interacting along an oil-water interface, wherein the inhibitor composition is added after a choke, manifold, turret, or a combination thereof.

35. The method of claim 34, wherein the step of adding the inhibitor composition includes injecting the inhibitor composition downhole.

36. The method of claim 34, wherein the step of adding the inhibitor composition includes dosing the inhibitor composition to an oil-water separator.

37. The method of claim 34, wherein the inhibitor composition includes at least one hydrotrope.

38. The method of claim 37, wherein the at least one hydrotrope includes monophosphate ester, diphosphate ester, or a combination thereof.

39. The method of claim 34, wherein the inhibitor composition is added at a concentration of less than 250 ppm in the mixture of oil and water.

40. The method of claim 34, characterized in that the pH of the oil and water mixture is greater than 6 following the addition of the inhibitor composition.

* * * * *